United States Patent
Ishikawa

(10) Patent No.: US 9,887,904 B2
(45) Date of Patent: Feb. 6, 2018

(54) INFORMATION PROCESSING APPARATUS, CONTROL METHOD, AND PROGRAM

(71) Applicant: Sony Computer Entertainment Inc., Tokyo (JP)

(72) Inventor: Hitoshi Ishikawa, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 58 days.

(21) Appl. No.: 14/947,219

(22) Filed: Nov. 20, 2015

(65) Prior Publication Data

US 2016/0174127 A1    Jun. 16, 2016

(30) Foreign Application Priority Data

Dec. 15, 2014    (JP) .................................. 2014-253141

(51) Int. Cl.
*H04L 12/755* (2013.01)
*H04L 12/721* (2013.01)

(52) U.S. Cl.
CPC .......... *H04L 45/124* (2013.01); *H04L 45/021* (2013.01)

(58) Field of Classification Search
CPC ........................... H04L 45/021; H04L 45/124
See application file for complete search history.

(56) References Cited

U.S. PATENT DOCUMENTS

2003/0142980 A1 *  7/2003  Baba ................... H04J 14/0201
                                                                   398/56
2009/0296719 A1 * 12/2009  Maier .................... H04L 45/12
                                                                   370/400

* cited by examiner

*Primary Examiner* — Jianye Wu
(74) *Attorney, Agent, or Firm* — Katten Muchin Rosenman LLP

(57) ABSTRACT

An information processing apparatus includes: a path information acquiring part acquiring path information formed by information indicating connection relationship set between multiple nodes and indicating cost of the connection relationship; an evaluation value giving part giving to the respective nodes included in the path information an evaluation value indicating cost between the node and a reference node; a determining part determining whether to establish as a path the interval between any two of the nodes, on the basis of the connection relationship and a magnitude relation between the evaluation values given to the nodes; and an evaluation value updating part updating the evaluation value of the respective nodes, on the basis of value indicating cost between the respective nodes and a node connected by the established path. Following the determination made by the determining part, the evaluation value updating part executes an evaluation value updating process repeatedly.

14 Claims, 14 Drawing Sheets

| EDGE ID | CONNECTION RELATIONSHIP | COST |
|---|---|---|
| E0 | A ← B | COST 0 (1.0) |
| E1 | D ← B | COST 1 (1.0) |
| E2 | B ← C | COST 2 (2.0) |
| E3 | C ← D | COST 3 (1.0) |
| E4 | C ← E | COST 4 (1.0) |
| E5 | F ← E | COST 5 (2.0) |
| E6 | D ← F | COST 6 (1.0) |

FIG.6

|   | PREPROCESSING STAGE | | FIRST TIME | | SECOND TIME | | THIRD TIME | |
|---|---|---|---|---|---|---|---|---|
|   | COST EVALUATION VALUE | ROOT ID | COST EVALUATION VALUE | ROOT ID | COST EVALUATION VALUE | ROOT ID | COST EVALUATION VALUE | ROOT ID |
| Z | 0   | Z | 0   | Z | 0   | Z | 0   | Z |
| X | 0.1 | Z | 0.1 | Z | 0.1 | Z | 0.1 | Z |
| Y | 0.2 | X | 0.3 | Z | 0.3 | Z | 0.3 | Z |
| W | 0.1 | Y | 0.3 | X | 0.4 | Z | 0.4 | Z |
| V | 0.8 | W | 0.9 | Y | 1.2 | Z | 1.2 | Z |
| U | 0.5 | V | 1.3 | W | 1.6 | X | 1.7 | Z |
| T | 0.3 | U | 0.8 | V | 1.7 | Y | 2.0 | Z |
| S | 0.1 | T | 0.4 | U | 1.7 | W | 2.1 | Z |

| NODE | POINTER VALUE | | COST EVALUATION VALUE (INITIAL VALUE) |
|---|---|---|---|
| | ESTABLISHED PATH COST | EDGE ID | |
| A | - | - | N |
| B | - | - | N |
| C | - | - | N |
| D | - | - | 0 |
| E | - | - | N |
| F | - | - | N |

FIG.10

| NODE | POINTER VALUE | | COST EVALUATION VALUE (INITIAL VALUE) |
|---|---|---|---|
| | ESTABLISHED PATH COST | EDGE ID | |
| A | - | - | N |
| B | 1.0 | E1 | N |
| C | - | - | N |
| D | - | - | 0 |
| E | - | - | N |
| F | 1.0 | E6 | N |

FIG.11

| NODE ID | POINTER VALUE | | COST EVALUATION VALUE (INITIAL UPDATE VALUE) | WORK COST EVALUATION VALUE | ROOT ID (INITIAL UPDATE VALUE) | WORK ROOT ID |
|---|---|---|---|---|---|---|
| | ESTABLISHED PATH COST | EDGE ID | | | | |
| A | - | - | N | | A | |
| B | 1.0 | 1 | 1.0 | | D | |
| C | - | - | N | | C | |
| D | - | - | 0 | | D | |
| E | - | - | N | | E | |
| F | 1.0 | 6 | 1.0 | | D | |

FIG.13

| NODE | POINTER VALUE | | COST EVALUATION VALUE (INITIAL UPDATE VALUE) | WORK COST EVALUATION VALUE | ROOT ID (INITIAL UPDATE VALUE) | WORK ROOT ID |
|---|---|---|---|---|---|---|
| | ESTABLISHED PATH COST | EDGE ID | | | | |
| A | - | - | N | N | A | A |
| B | 1.0 | 1 | 1.0 | 1.0 | D | D |
| C | - | - | N | N | C | C |
| D | - | - | 0 | 0 | D | D |
| E | - | - | N | N | E | E |
| F | 1.0 | 6 | 1.0 | 1.0 | D | D |

FIG.14

| NODE | POINTER VALUE | | COST EVALUATION VALUE (UPDATED) | WORK COST EVALUATION VALUE | ROOT ID (UPDATED) | WORK ROOT ID |
|---|---|---|---|---|---|---|
| | ESTABLISHED PATH COST | EDGE ID | | | | |
| A | - | - | N | | A | |
| B | 1.0 | 1 | 1.0 | | D | |
| C | - | - | N | | C | |
| D | - | - | 0 | | D | |
| E | - | - | N | | E | |
| F | 1.0 | 6 | 1.0 | | D | |

FIG.15

| NODE | POINTER VALUE | | COST EVALUATION VALUE (OF PRECEDING FRAME) |
|---|---|---|---|
| | ESTABLISHED PATH COST | EDGE ID | |
| A | - | - | N |
| B | - | - | 1.0 |
| C | - | - | N |
| D | - | - | 0 |
| E | - | - | N |
| F | - | - | 1.0 |

FIG.16

| NODE | POINTER VALUE | | COST EVALUATION VALUE (OF PRECEDING FRAME) |
|---|---|---|---|
| | ESTABLISHED PATH COST | EDGE ID | |
| A | - | - | N |
| B | 1.0 | 1 | 1.0 |
| C | 3.0 | 2 | N |
| D | - | - | 0 |
| E | 3.0 | 5 | N |
| F | 1.0 | 6 | 1.0 |

FIG.17

| NODE | POINTER VALUE | | COST EVALUATION VALUE (INITIAL UPDATE VALUE) | WORK COST EVALUATION VALUE | ROOT ID (INITIAL UPDATE VALUE) | WORK ROOT ID |
|---|---|---|---|---|---|---|
| | ESTABLISHED PATH COST | EDGE ID | | | | |
| A | - | - | N | | A | |
| B | 1.0 | 1 | 1.0 | | D | |
| C | 3.0 | 2 | 2.0 | | B | |
| D | - | - | 0 | | D | |
| E | 3.0 | 5 | 2.0 | | F | |
| F | 1.0 | 6 | 1.0 | | D | |

FIG.18

| NODE | POINTER VALUE | | COST EVALUATION VALUE (INITIAL UPDATE VALUE) | WORK COST EVALUATION VALUE | ROOT ID (INITIAL UPDATE VALUE) | WORK ROOT ID |
|---|---|---|---|---|---|---|
| | ESTABLISHED PATH COST | EDGE ID | | | | |
| A | - | - | N | N | A | A |
| B | 1.0 | 1 | 1.0 | 1.0 | D | D |
| C | 3.0 | 2 | 2.0 | 3.0 | B | D |
| D | - | - | 0 | 0 | D | D |
| E | 3.0 | 5 | 2.0 | 3.0 | F | D |
| F | 1.0 | 6 | 1.0 | 1.0 | D | D |

| NODE | POINTER VALUE | | COST EVALUATION VALUE (UPDATED) | WORK COST EVALUATION VALUE | ROOT ID (UPDATED) | WORK ROOT ID |
|---|---|---|---|---|---|---|
| | ESTABLISHED PATH COST | EDGE ID | | | | |
| A | - | - | N | | A | |
| B | 1.0 | 1 | 1.0 | | D | |
| C | 3.0 | 2 | 3.0 | | D | |
| D | - | - | 0 | | D | |
| E | 3.0 | 5 | 3.0 | | D | |
| F | 1.0 | 6 | 1.0 | | D | |

INFORMATION PROCESSING APPARATUS, CONTROL METHOD, AND PROGRAM

BACKGROUND

The present disclosure relates to an information processing apparatus, a control method, and a program.

Techniques are known which are used to find the shortest path from a source node to a target node in a path graph composed of multiple nodes and edges each associating a connection relationship between any two nodes with the weight of that connection relationship. In the past, the search for the shortest path was made by starting from the source node and tracing the connected nodes consecutively.

SUMMARY

In order to alleviate the growing burden of path finding attributable to increases in the number of nodes and to the time change of the path graph, it is preferred to carry out path finding in parallel processing. In the past, however, because the number of nodes connected to each node is not the same, the parallel processing might not be performed efficiently.

The present disclosure has been made in view of the above circumstances, and it is desirable to provide an information processing apparatus that performs optimum path finding in a manner suitable for parallel processing.

In carrying out the present disclosure and according to one embodiment thereof, there is provided an information processing apparatus including: a path information acquiring part acquiring path information formed by information indicating a connection relationship set between a plurality of nodes and by information indicating a cost of the connection relationship; an evaluation value giving part giving to each of the nodes included in the path information an evaluation value indicating a cost between the node in question on the one hand and a reference node serving as a reference among the nodes by a value constituting an initial value on the other hand; a determining part determining whether or not to establish as a path the interval between any two of the nodes having the connection relationship therebetween, on a basis of the connection relationship in question and on a magnitude relation between the evaluation values given to the two nodes; and an evaluation value updating part updating the evaluation value of each of the nodes, on a basis of a value indicating a cost between the node in question on the one hand and a node connected therewith by the established path on the other hand. Following the determination made by the determining part on the basis of the updated evaluation value, the evaluation value updating part executes an evaluation value updating process repeatedly.

Preferably in the information processing apparatus above, each of the nodes may be given a root value indicating the node connected with the node in question via the established path. The evaluation value updating part may update the evaluation value to a value obtained by adding to the value indicating the cost the value indicating the cost given to the node in question.

Preferably, the information processing apparatus above may further include a root value updating portion updating the root value given to each of the nodes to the root value given to the node indicated by the root value.

Preferably in the information processing apparatus above, the evaluation value updating part may perform the evaluation value updating process repeatedly until the root value given to each of the nodes points to the reference node.

Preferably in the information processing apparatus above, if conditions are met for a plurality of intervals each between nodes having same source node or same destination node to be established as a path each, the determining part may establish as the path the interval between the nodes of which the values updated by the evaluation value updating part are the smallest.

Preferably in the information processing apparatus above, the initial value of the evaluation value given to the reference node may be smaller than an initial value of the evaluation value given to any other node.

Preferably in the information processing apparatus above, if the evaluation value given to the source node for the interval between any two nodes is larger than the evaluation value given to the destination node, the determining part may establish the interval between the two nodes as a path.

Preferably in the information processing apparatus above, if the evaluation value given to the destination node for the interval between any two nodes is larger than the evaluation value given to the source node, the determining part may establish the interval between the two nodes as a path.

Preferably in the information processing apparatus above, during repeated execution of the process, the information indicating the cost of the connection relationship may be varied.

Preferably in the information processing apparatus above, during repeated execution of the process, the reference node may be varied.

Preferably in the information processing apparatus above, the path information may be formed by information indicating a directed connection relationship set between a plurality of nodes and by information indicating a cost of the directed connection relationship.

Preferably in the information processing apparatus above, the path information may be formed by information indicating an undirected connection relationship set between a plurality of nodes and by information indicating a cost of the undirected connection relationship.

According to another embodiment of the present disclosure, there is provided a control method including: acquiring path information formed by information indicating a connection relationship set between a plurality of nodes and by information indicating a cost of the connection relationship; giving to each of the nodes included in the path information an evaluation value indicating a cost between the node in question on the one hand and a reference node serving as a reference among the nodes by a value constituting an initial value on the other hand; determining whether or not to establish as a path the interval between any two of the nodes having the connection relationship therebetween, on a basis of the connection relationship in question and on a magnitude relation between the evaluation values given to the two nodes; and updating the evaluation value of each of the nodes, on a basis of a value indicating a cost between the node in question on the one hand and a node connected therewith by the established path on the other hand. Following the determination made in the determining on the basis of the updated evaluation value, the evaluation value updating executes an evaluation value updating process repeatedly.

According to a further embodiment of the present disclosure, there is provided a program for a computer including: by a path information acquiring part, acquiring path information formed by information indicating a connection relationship set between a plurality of nodes and by information indicating a cost of the connection relationship; by an evaluation value giving part, giving to each of the nodes included in the path information an evaluation value indicating a cost between the node in question on the one hand and a reference node serving as a reference among the nodes by a value constituting an initial value on the other hand; by a determining part, determining whether or not to establish as a path the interval between any two of the nodes having the connection relationship therebetween, on a basis of the connection relationship in question and on a magnitude relation between the evaluation values given to the two nodes; and by an evaluation value updating part, updating the evaluation value of each of the nodes, on a basis of a value indicating a cost between the node in question on the one hand and a node connected therewith by the established path on the other hand. Following the determination made by the determining part on the basis of the updated evaluation value, the evaluation value updating part executes an evaluation value updating process repeatedly. This program may also be stored on a computer-readable information storage medium.

BRIEF DESCRIPTION OF THE DRAWINGS

Further objects and advantages of the present disclosure will become apparent upon a reading of the following description and appended drawings in which:

FIG. 6 is a tabular view showing results of processing performed repeatedly by an update processing part;

FIG. 10 is a tabular view showing pointer information in effect after the path has been established;

FIG. 11 is a tabular view showing pointer information in effect after preprocessing has been performed;

FIG. 13 is a tabular view showing pointer information in effect after updated cost evaluation values have been calculated;

FIG. 14 is a tabular view showing pointer information in effect after cost evaluation value updating processes have been performed;

FIG. 15 is a tabular view showing pointer information in effect before the established path determining process is started in frame;

FIG. 16 is a tabular view showing pointer information in effect after the path has been established in frame;

FIG. 17 is a tabular view showing pointer information in effect after the preprocessing has been performed in frame;

FIG. 18 is a tabular view showing pointer information in effect after cost evaluation values have been calculated in frame;

DETAILED DESCRIPTION OF THE PREFERRED EMBODIMENTS

Figure 1:
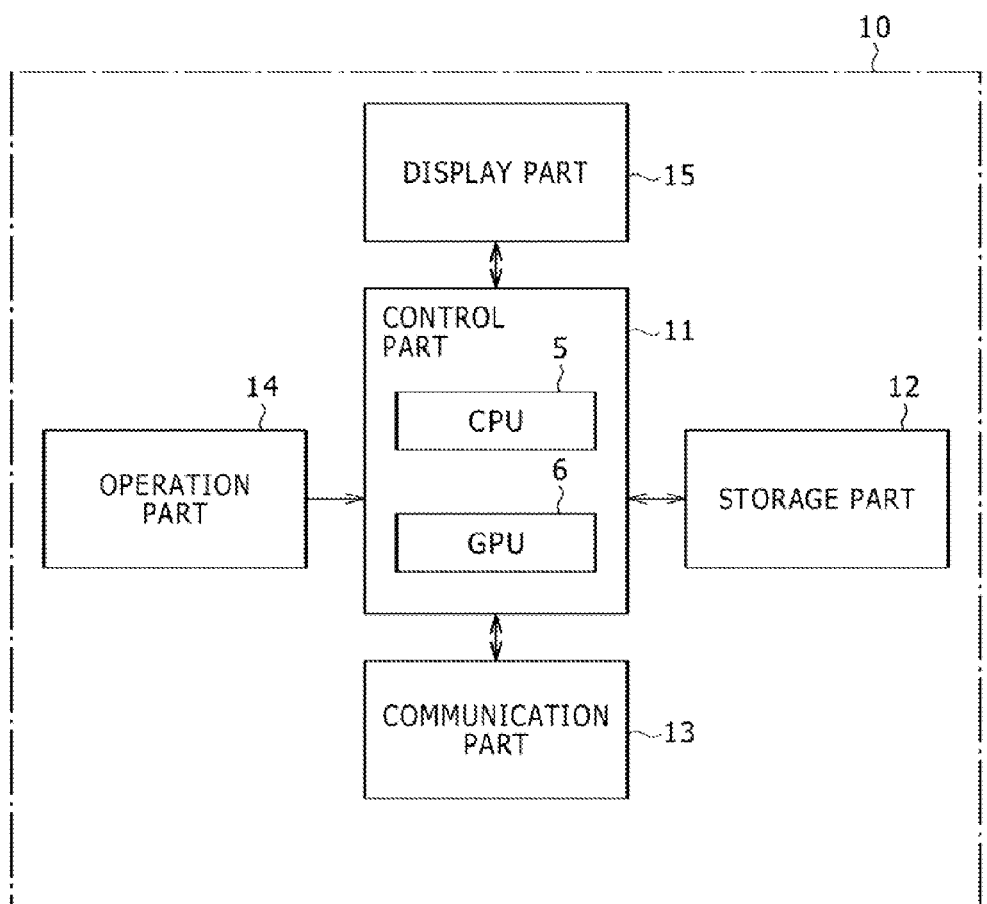
FIG. 1 is a diagram showing a typical structure of an information processing apparatus as an embodiment of the present disclosure.

Some embodiments of the present disclosure will now be described in detail with reference to the accompanying drawings. Throughout the drawings, like reference characters designate like or corresponding elements, and their explanations will be omitted where redundant.

FIG. 1 shows a typical structure of an information processing apparatus 10 as one embodiment of the present disclosure. For example, the information processing apparatus 10 embodying the disclosure is a home-use game machine or a personal computer. As shown in FIG. 1, the information processing apparatus 10 includes a control part 11, a storage part 12, a communication part 13, an operation part 14, and a display part 15.

The control part 11 includes a central processing unit (CPU) 5 and a graphical processing unit (GPU) 6, for example. The control part 11 performs various kinds of information processing in accordance with programs stored in the storage part 12. Specific processes executed by the control part 11 of this embodiment will be discussed later.

The storage part 12 includes a memory device such as a random access memory (RAM) or a read only memory (ROM) and a hard disk, for example. The storage part 12 stores various items of data, as well as the programs executed by the control part 11. Also, the storage part 12 functions as a work memory for the control part 11.

The communication part 13 is a communication interface that receives data from the outside over a communication network and outputs the received data to the control part 11. Also, under instructions from the control part 11, the communication part 13 transmits various items of data to another information processing apparatus connected via the communication network.

The operation part 14 is a keyboard, a mouse, and/or the controller of a home-use game machine. The operation part 14 accepts a user's operation input and outputs signals representing the content of the input to the control part 11.

The display part 15 is a display device such as a liquid crystal display or an organic electroluminescence (EL) display. Under instructions from the control part 11, the display part 15 displays diverse images.

The information processing apparatus 10 may further include universal serial bus (USB) ports, as well as an optical disk drive capable of reading data from digital versatile disk (DVD)-ROMs, Blu-ray (registered trademark) disks, etc.

The information processing apparatus 10 of this embodiment performs an optimum path finding process that finds an optimum path from a reference node to each of multiple nodes or vice versa in a path graph formed by the nodes and by information indicating a directed connection relationship between any two of the nodes. The optimum path finding process is performed primarily by the GPU 6 of the control part 11. Alternatively, the optimum path finding process may be carried out by the CPU or by some other suitable device. Because the GPU 6 can handle more simultaneously executable processing units (threads) than the CPU 5, the GPU 6 is better suited for parallel processing. On the other hand, the simultaneously executable threads are required to be processes of the same content. This embodiment is structured efficiently to perform the path finding process using the GPU 6.

Figures 2, 3:
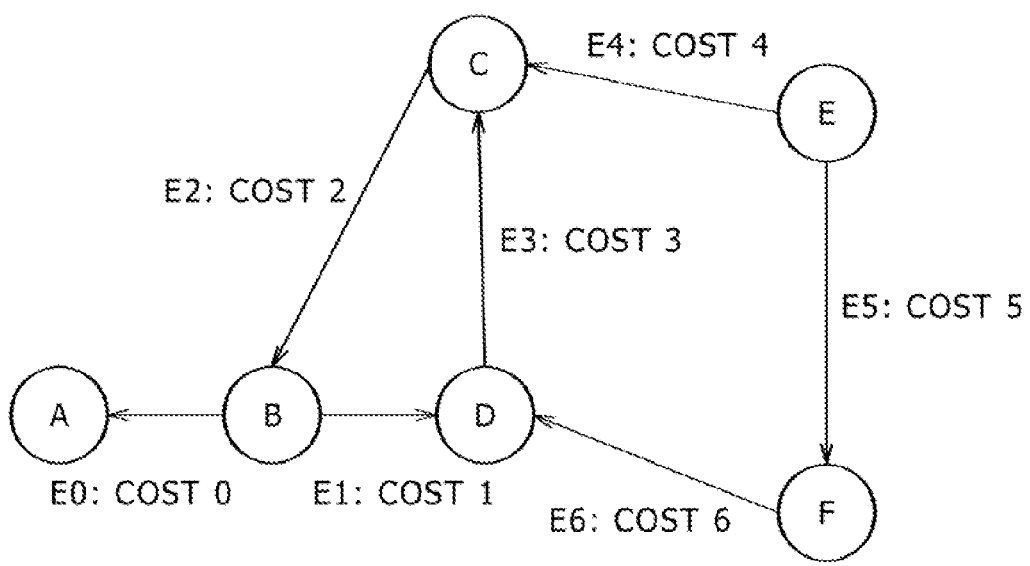
FIG. 2 is a diagram showing a typical path graph.
FIG. 3 is a tabular view showing edge information representing a structure of the path graph.

Explained below is an example in which an optimum path is found on the basis of a reference node in the path graph shown in FIG. 2. As shown in FIG. 2, the path graph is made up of multiple nodes and information indicating the connection relationship between any two of the nodes. With this embodiment, the information representing the structure of the path graph is stored in an edge information storing part in the form of edge information indicating a directed connection relationship between any two nodes in the path graph. First, each of the nodes included in the path graph is given node identification information (node ID) identifying the node in question. The path graph shown in FIG. 2 includes six nodes A through F. The edge information indicates the connection relationships of node pairs each composed of two nodes having a directed connection relationship therebetween, and the cost constituting the weight of each of the connection relationships. The connection relationship of a given node pair denotes a path directed from one node to the other node, as indicated by arrows in the path graph of FIG. 2. Although the connection relationship of each node pair in the path graph of FIG. 2 is shown unidirectional, the connection relationship of any node pair may also be bidirectional according to the present disclosure. That is, the path from A to B may be supplemented with a path from B to A. In this case, the path graph may represent bidirectional connection relationships each given a cost, or undirected connection relationships each simply given the cost between nodes. The cost of the connection relationship of a given node pair indicates the ease with which to pass from one node to the other node. The higher the cost of a path, the harder to pass through that path, and vice versa. In a specific example of application of the path graph, multiple nodes denote locations, the edge information stands for routes each connecting two nodes, and the cost of each connection relationship represents the distance between any two of the locations.

FIG. 3 shows the edge information representing the structure of the path graph depicted in FIG. 2. As shown in FIG. 3, the edge information associates the edge IDs identifying multiple edges included in the path graph, with information indicating a directed connection relationship between the two nodes included in each of the edges, and with information indicating the costs of the connection relationships. Where the connection relationship of a given node pair is bidirectional, the edge information corresponding to each of the two directions is assumed to be included. That is, the edge information includes the paths of all node pairs that exist in the path graph. This edge information is used to find an optimum path on the basis of a reference node that is one of the multiple nodes included in the path graph of FIG. 2.

Figure 4:
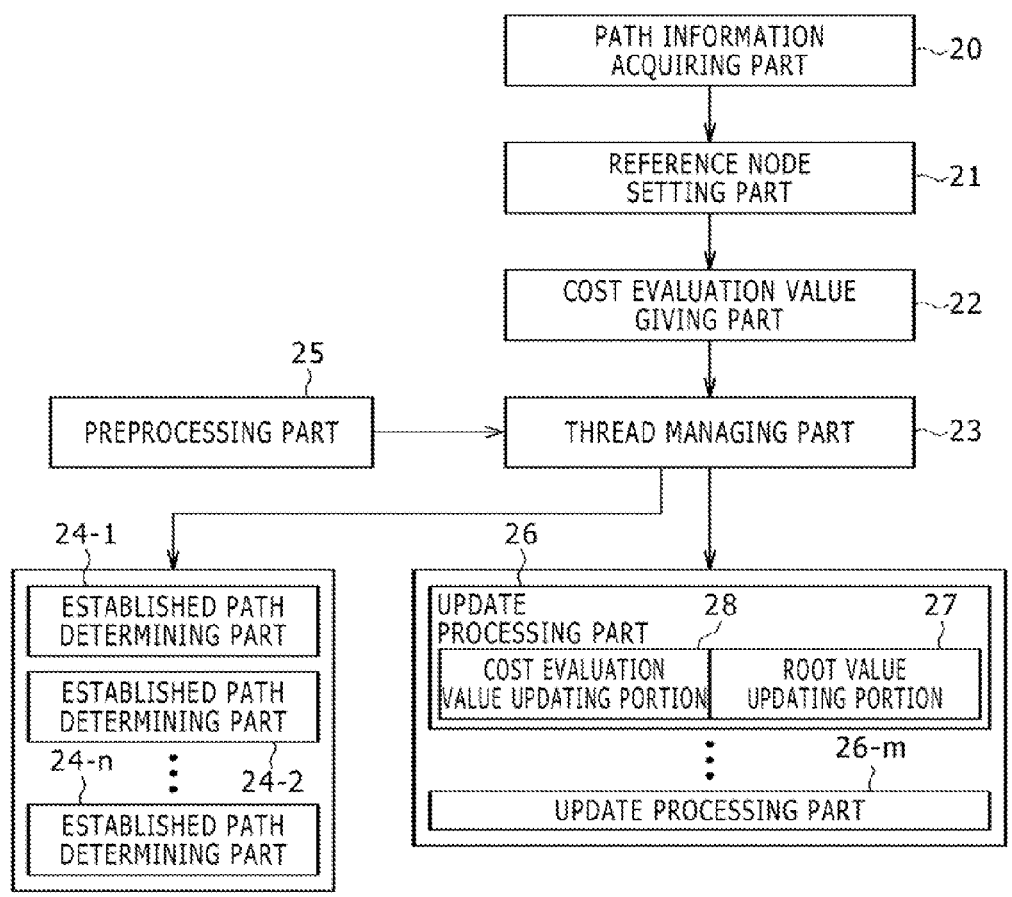
FIG. 4 is a functional block diagram showing major functions implemented by the information processing apparatus as one embodiment of the present disclosure.

FIG. 4 is a functional block diagram showing major functions implemented by the information processing apparatus 10 as one embodiment of the present disclosure. As shown in FIG. 4, the control part 11 in the information processing apparatus 10 of this embodiment functionally includes a path information acquiring part 20, a reference node setting part 21, a cost evaluation value giving part 22, a thread managing part 23, established path determining parts 24 (24-1 through **24-*n*), a preprocessing part 25, and update processing parts 26 (26-1 through 26-*m*) each including a root value updating portion 27 and a cost evaluation value updating portion 28. These functions are implemented by the control part 11 executing a program stored in the storage part 12. This program is supplied to the information processing apparatus 10** by means of computer-readable information storage media such as optical disks, magnetic disks, magnetic tapes, magneto-optical disks, or flash memories, or via communication means such as the Internet.

The path information acquiring part 20 acquires path information that constitutes an object of optimum path finding. The object of optimum path finding is assumed to be a path graph that indicates multiple nodes and directed connection relationships set between the nodes. The path information acquiring part 20 acquires as the path information the edge information representing the structure of the path graph and stores the acquired information into the edge information storing part.

The reference node setting part 21 sets the reference node serving as the reference for path finding from among the multiple nodes included in the path information acquired by the path information acquiring part 20. With this embodiment, the node constituting a path ending point is set as the reference node. Alternatively, the node constituting a path starting point may be set as the reference node.

The cost reference value giving part 22 gives each of the nodes included in the path information a value (cost evaluation value) that evaluates the cost between the node and the reference node. The initial value of the cost evaluation value is a data value that distinguishes the reference node set by the reference node setting part 21 from any node other than the reference node. For example, it is assumed that the initial value of the reference node is 0 and that of any other node is a positive value N. The value N is to be a sufficiently large number that exceeds the sum of the costs of all edges included in the path information.

The initial value N for each of the nodes other than the reference node may be the same or may be a different value. If a different initial value is to be set for each node and if the positional relationship of each node is known, then a value may be set to correspond to the distance between the node and the reference node. Specifically, a smaller value may be set for a node positionally closer to the reference node, and a larger value may be set for a node positionally farther from the reference node. This makes it easier to establish the path for the nodes the closer they are to the reference node, which accelerates the optimum path finding process.

The thread managing part 23 manages the content of the processing to be performed by simultaneously executable multiple threads, and a processing object assigned to each of the threads. With this embodiment, before the established path determining process is performed, thread managing part 23 assigns to each thread each of multiple items of edge information stored in the edge information storing part as the processing object of the established path determining process. The thread managing part 23 also carries out a synchronizing process in which to wait for the established path determining process to be completed by each of all threads that were given the assignments. This enables the established path determining processes to be performed in parallel on the multiple items of edge information. Also, before an updating process is carried out, the thread managing part 23 assigns to each thread each of the nodes included in the path information acquired by the path information acquiring part 20 as the processing object of the updating process. Furthermore, the thread managing part 23 performs a synchronizing process in which to wait for the updating process to be completed by all threads that were given the assignments. This enables the updating processes to be performed in parallel on the multiple nodes.

The established path determining parts 24 determine whether the path is established for each edge (i.e., for each connection relationship) on the basis of the cost evaluation value set to each node by the cost evaluation value giving part 22 and the edge information stored in the edge information storing part. In this embodiment, the established path determining parts 24 perform the established path determining process on each item of the edge information assigned to each edge by the thread managing part 23. The established path determining parts 24 determine whether or not each of the multiple connection relationships included in the edge information is established as the path. Whether a given connection relationship is established as the path is determined by two parameters: the direction of the two nodes having the connection relationship therebetween, and the cost evaluation value set for each of the two nodes. Specifically, of the two nodes having the connection relationship, the node from which the relationship originates is defined as the source node and the node at which the relationship terminates is defined as the destination node. (For example, in the connection relationship from B to A, the source node is B and the destination node is A.) Suppose that the cost evaluation value given to the reference node is assigned an initial value of 0 and that the cost evaluation value given to any other node is assigned an initial value of N (positive value). In that case, the established path determining parts 24 each determine that the edge in question is established as the path if the cost evaluation value set to the destination node is lower than the cost set to the source node. In this manner, whether the path is established is determined on the basis of the connection relationship between the two nodes and the magnitude relation of the cost evaluation values given to the nodes involved. This generates a unidirectional, non-cyclical path.

The results of the determination by the established path determining parts 24 are stored into a pointer information storing part. The pointer information storing part stores pointer information in which a pointer value and a cost evaluation value are associated with each of the nodes included in the path information. The pointer value indicates whether or not the path originating from a given node as the source node has been established, and includes an edge ID and an established path cost. The established path cost of the source node of which the connection relationship has been established as the path by each established path determining part 24 is associated with the sum of the cost of the connection relationship in question and the cost evaluation value set to the destination node, the established path cost being further associated with the edge ID identifying this connection relationship. On the other hand, the source node of which the connection relationship has not been established as the path by the established path determining part 24 is not associated with any pointer value. In this manner, whether the path is established is determined by whether or not the pointer value of each node is associated with a value.

As discussed above, the established path determining process performed by the established path determining part 24 involves determining whether the relation in which the cost evaluation value set to the destination node is lower than the cost evaluation value set to the source node is established. That means the same algorithm may be executed on each of the edges having a unidirectional connection relationship, which allows the established path determining parts 24 to carry out the established path determining processes in parallel on the edges involved.

The preprocessing part 25 performs preprocessing for updating the cost evaluation value and root value given to each node. The preprocessing part 25 sets initial update values of the root ID and cost evaluation value to each of the nodes included in the pointer information. The root ID identifies a terminating node, i.e., the destination to which the own node connects via the established path. The initial update value of the cost evaluation value is set as an initial value for a cost evaluation value updating process, and is different from the initial value of the cost evaluation value given to each node by the cost evaluation value giving part 22. The initial update value of the cost evaluation value indicates the cost of the established path connected with each node. Specifically, to the reference node, the value of 0 is set as the initial update value of the cost evaluation value; to each node to which no pointer value is set, the value of N is set as the initial update value. To each node to which a pointer value is set, the cost of the edge ID associated with the own node is set as the initial update value. In this manner, the cost of the established path is set to the source node of that established path; the value of N is set to the source node of a non-established node. This indicates the cost of the established path connected with each node. As the initial update value of the root ID, the preprocessing part 25 sets the value indicative of the destination node (node ID) to the root ID of each node to which a pointer value is set (the source node of the established path), and sets a value indicating the own node to the root ID of any other node. This indicates the cost of the destination node with which each node is connected by the established path.

The update processing parts 26 each include the root value updating portion 27 and the cost evaluation value updating portion 28. On the basis of the root ID and the initial update value of the cost evaluation value set by the preprocessing part 25, the update processing parts 26 update the root IDs and cost evaluation values of the nodes involved. With this embodiment, on each of the nodes assigned to the threads by the thread managing part 23, the root value updating portion 27 performs a root value updating process and the cost evaluation value updating portion 28 carries out a cost evaluation value updating process in parallel. Specifically, the root value updating portion 27 acquires the node ID of a given root ID associated with the node identified by the initial update value of that root ID, and stores temporarily the acquired root ID into a root ID work memory. The cost evaluation value updating portion 28 also calculates an updated cost evaluation value by use of this calculation formula: evaluation value X (cost evaluation value associated with the node identified by the initial update value of the root ID)+evaluation value Y (cost evaluation value associated with the own node)=updated cost evaluation value Z (of the own node). The cost evaluation value updating portion 28 stores the calculated updated cost evaluation value temporarily into a cost evaluation value work memory. After the acquired root IDs of all nodes assigned to the threads by the thread managing part 23 have been stored into the root ID work memory, and after the updated cost evaluation values of all nodes assigned to the threads by the thread managing part 23 have been stored into the cost evaluation value work memory, the root value updating portion 27 updates the root IDs to those stored in the root ID work memory. The cost evaluation value updating portion 28 further updates the cost evaluation values to the updated cost evaluation values stored in the cost evaluation value work memory.

As described above, the process of updating the cost evaluation value performed by the cost evaluation value updating portion 28 uses the following calculation formula: (cost evaluation value associated with the root ID)+(cost evaluation value associated with the own node)=(updated cost evaluation value of the own node). The root value updating process performed by the root value updating portion 27 updates a given root ID to the node ID of the root ID associated with the node identified by the root ID in question. In this manner, the processing above is carried out by use of the same algorithm on each node that is given a root ID and a cost evaluation value. This allows the cost evaluation value updating portions 28 in the update processing parts 26 to perform the updating processes (root value updating process and cost evaluation value updating process) in parallel on the nodes involved.

Figure 5:
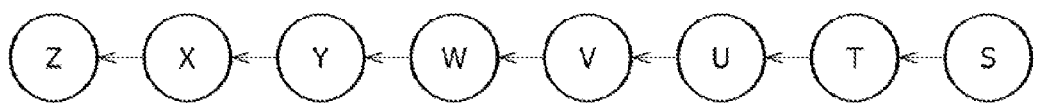
FIG. 5 is a diagram showing typical nodes of which the path has been established by an established path determining part.

On the basis of the updated cost evaluation values and the updated root values, the update processing parts 26 repeat the updating processes until the root ID of the source node of the established path points to the terminating node of the established path and the root ID of any other node points to the own node. At this point, if the number of nodes is R, then the processing is repeated up to $\log_2 R$ times so that the root ID of the source node of the established path may point to the terminating node and that the root ID of any other node may point to the own node. Given below is a specific example in which the processing is repeated by the update processing parts 26. FIG. 5 shows typical nodes of which the path has been established by the established path determining part 24. As shown in FIG. 5, it is assumed that given a node Z as the reference node (terminating node), a path is established in such a manner that eight nodes consisting of the node Z (with cost evaluation value of 0), a node X (with cost evaluation value of 0.1), a node Y (with cost evaluation value of 0.2), a node W (with cost evaluation value of 0.1), a node V (with cost evaluation value of 0.8), a node U (with cost evaluation value of 0.5), a node T (with cost evaluation value of 0.3), and a node S (with cost evaluation value of 0.1) are serially connected thereby. FIG. 6 shows the results of the processing performed repeatedly by the update processing parts 26 on the nodes involved on the basis of the established path indicated in FIG. 5. As shown in FIG. 6, performing the processing three times establishes the root ID associated with the source node of the established path as the terminating node (reference node in this case) of the established path. Performing the above-described cost evaluation value updating process and root value updating process allows for faster path finding than if the nodes are traced one at a time up to the reference node.

The path establishing process and updating process may be performed repeatedly in series per frame (e.g., 1/60 second). Every time the updating process is terminated, the established path is reset.

Figure 7:
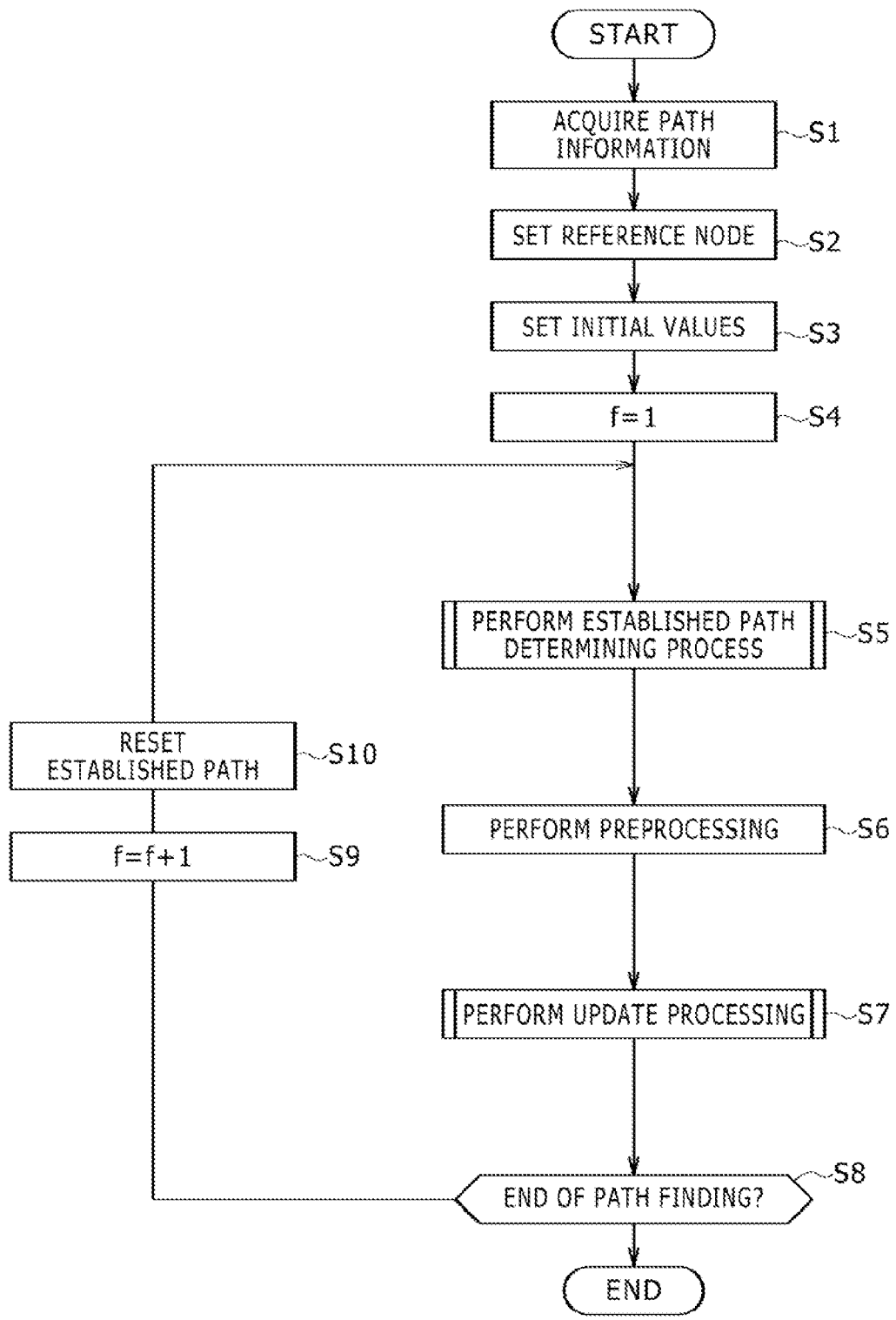
FIG. 7 is a flowchart showing a typical flow of an optimum path finding process performed by the information processing apparatus as one embodiment of the present disclosure.

Explained below with reference to the flowchart of FIG. 7 is a typical flow of the optimum path finding process performed by the information processing apparatus 10 embodying the present disclosure. It is assumed here that optimum path finding is carried out in reference to one of the multiple nodes included in the path graph shown in FIG. 2 and set as the reference (reference node).

First, the path information acquiring part 20 acquires the information about the path graph that is the object of optimum path finding (step S1). Here, the path information acquiring part 20 acquires as the path information the edge information representing the structure of the path graph, and stores the acquired information into the edge information storing part. For example, the path information acquiring part 20 stores the edge information listed in FIG. 3 into the edge information storing part as the information about the path graph shown in FIG. 2.

The reference node setting part 21 then sets a reference node from among the multiple nodes included in the path information acquired by the path information acquiring part 20 (step S2). It is assumed that the reference node setting part 21 sets the terminating node of the path as the reference node, such as a node D in this case.

Figures 8, 9:
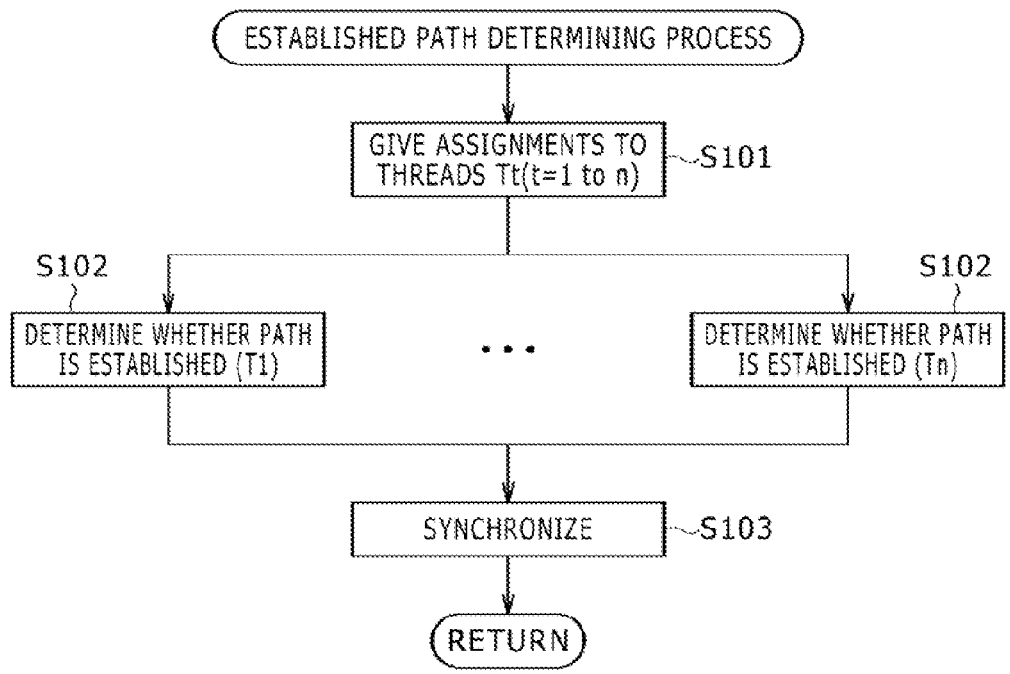
FIG. 8 is a tabular view showing pointer information in which an initial value of a cost evaluation value is set to each node.
FIG. 9 is a flowchart showing a typical flow of an established path determining process.

Next, the cost evaluation value giving part 22 gives each of the multiple nodes in the path information an initial value of the cost evaluation value for evaluating the cost between the node and the reference node (step S3). In this case, the cost evaluation value giving part 22 sets 0 to the node D serving as the reference node as the initial value of the cost evaluation value. The cost evaluation value giving part 22 sets N to the nodes other than the reference node, i.e., node A, node B, node C, node E, and node F as the initial value of their cost evaluation values. The initial values of the cost evaluation values given by the cost evaluation value giving part 22 to the nodes are stored into the pointer information storing part as pointer information. FIG. 8 shows the pointer information in which the initial value of the cost evaluation value is set to each node.

An initial value of 1 is set to a variable f (step S4), followed by execution of the established path determining process (step S5). Here, the variable f denotes a frame. This is a counter variable that takes an integer value of at least 1.

The established path determining process is explained below with reference to the flowchart of FIG. 9. As shown in FIG. 9, the thread managing part 23 first assigns each of the multiple items of edge information stored in the edge information storing part to each of the threads as the processing object of the established path determining process (step S101). Specifically, the thread managing part 23 is assumed to assign the edge information of the processing object to as many as n threads Tt (t is one of the integers ranging from 1 to n). The edge information storing part here stores seven items of edge information ranging from E0 to E6. These items are assigned to the threads T1 through T7, respectively. The established path determining part 24 carries out the established path determining processes in parallel on the threads involved.

On each thread, the established path determining part 24 determines whether a path is established on the basis of the edge information as well as the initial value of the cost evaluation value set to each node by the cost evaluation value giving part 22 (step S102). The established path determining part 24 determines whether or not the relation of (cost evaluation value set to the destination node)<(cost evaluation value set to the source node) holds. In this case, the relation holds because, when the edge ID is 1, the cost evaluation value of 0 is set to the destination node (node D) and the cost evaluation value of N is set to the source node (node B). Likewise, the above relation holds when the edge ID is 6. As a result, given the edge information shown in FIG. 3, the established path determining part 24 establishes the edge having the edge ID of 1 and the edge having the edge ID of 6 as the path. The established path determining part 24 then associates a pointer value with the source node of the established path. FIG. 10 shows pointer information in effect after the path has been established. As shown in FIG. 10, after the path has been established, the pointer information is associated with the node B as the source node of an edge having the edge ID of 1 established as part of the path, and with the node F as the source node of another edge having the edge ID of 6 established as the path. Each pointer value includes an established path cost and an edge ID. The edge ID is associated with the ID of an edge established as part of the path. The established path cost is associated with the sum of the cost of the established edge and of the cost evaluation value of the destination node. For example, the edge ID of the node B is associated with the edge having the edge ID of 1 of the established path. The cost value of the node B is associated with 1.0 as the sum of the weight 1.0 of the edge ID of 1 and of the cost evaluation value 0 of the node D as the destination node. Here, the initial value of the cost evaluation value given to the reference node is made smaller than the initial values for the other nodes. This allows the established path determining part 24 to establish a path such that the cost evaluation value of the destination node is significantly small, thereby establishing the path having the reference node as its ending point.

The thread managing part 23 performs the process of synchronizing the threads being subjected to parallel processing (step S103), before making a return. That is, the thread managing part 23 makes a return after the established path determining part 24 has completed the established path determining process on all the threads (T1 through Tn) that were given the assignments by the thread managing part 23.

When the path is established by the established path determining process, the preprocessing part 25 carries out preprocessing for updating the node ID and cost evaluation value to be given to each node (step S6). The preprocessing part 25 sets the initial update values for the root ID and cost evaluation value to each of the nodes included in the pointer information. FIG. 11 shows pointer information in effect after preprocessing has been performed. As shown in FIG. 11, the preprocessing part 25 sets a cost of (1.0) for the edge ID of E1 associated with the node B to that node B as the source node having the edge ID of 1 established as part of the path, the cost being the initial update value of the cost evaluation value; and sets the node D as the destination node having the edge ID of E1, the node D being the initial update value of the root ID. Likewise, the preprocessing part 25 sets a cost of (1.0) for the edge ID of 6 associated with the node F to that node F as the source node having the edge ID of E6 established as part of the path, the cost being the initial update value of the cost evaluation value; and sets the node D as the destination node having the edge ID of E6, the node D being the initial update value of the root ID. Further, the preprocessing part 25 sets 0 as the initial update value of the cost evaluation value to the node D that is the reference node, and sets the own node as the initial update value of the root ID. To all other nodes (node A, node C, and node E), the preprocessing part 25 sets N as the initial update value of the cost evaluation value and sets the own node as the initial update value of the root ID.

Then follows the updating process (step S7) in which the root ID of each node and its cost evaluation value are updated on the basis of the initial update values of the root IDs and cost evaluation values set by the preprocessing part 25.

Figure 12:
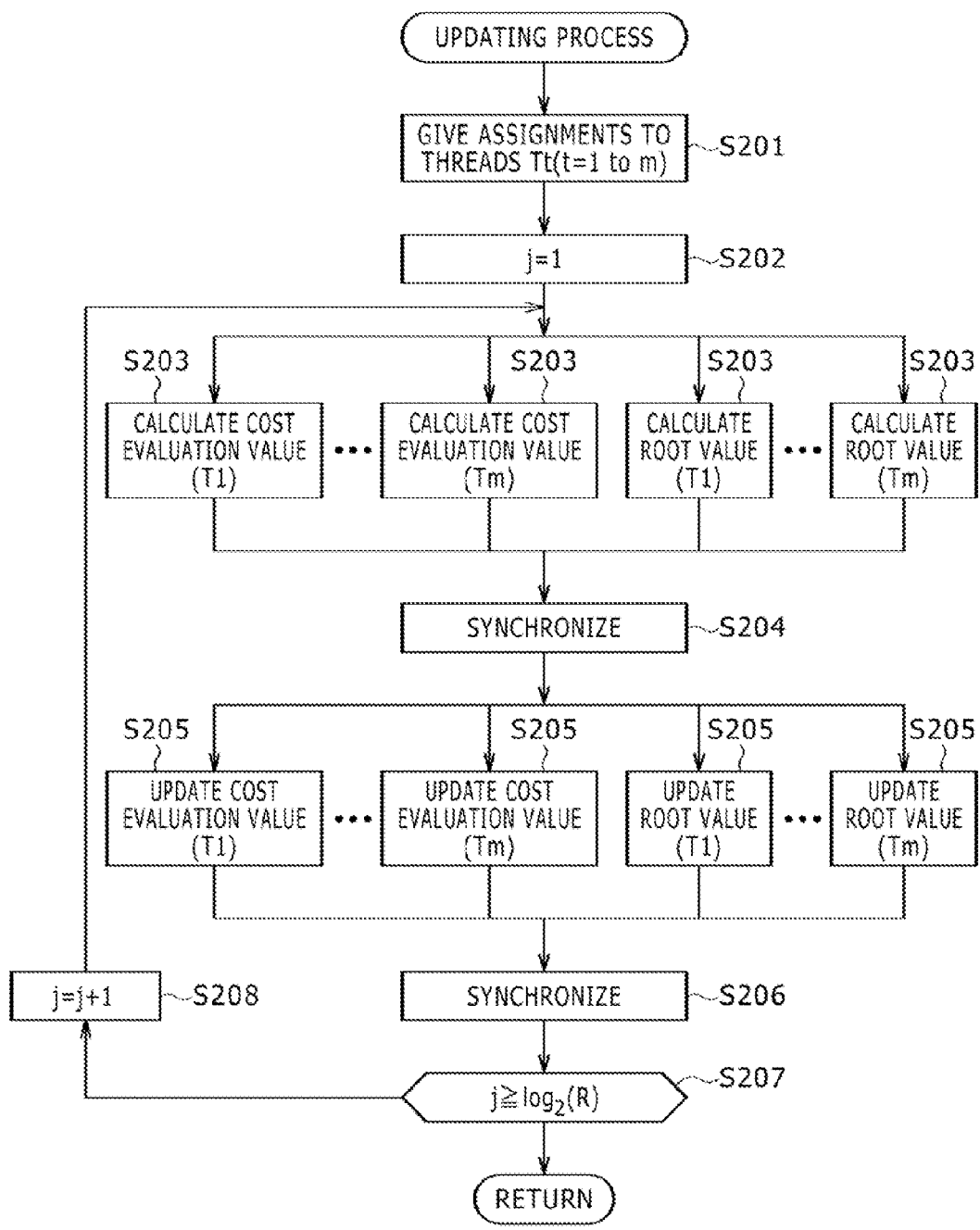
FIG. 12 is a flowchart showing a typical flow of an updating process.

The updating process is explained here with reference to the flowchart of FIG. 12. As shown in FIG. 12, the thread managing part 23 first assigns each of the multiple nodes included in the pointer information to each thread as the processing object of the cost evaluation value updating process and of the root value updating process (step S201). The thread managing part 23 assigns each node of the processing object to each of m threads Tt (t is one of the integers ranging from 1 to m). In this case, the six nodes A through F included in the pointer information are assigned to threads T1 through T6, respectively.

An initial value of 1 is set to a variable i (i=1; step S202). The update processing parts 26 carry out their update value calculating processes in parallel on the threads involved (step S203). The variable i is a counter variable that takes an integer number of at least 1.

The update value calculating processes performed in step S203 by the update processing parts 26 with the cost evaluation value updating portions 28 acquire the root values to be updated by the root value updating portions 27 and calculate the cost evaluation values to be updated by the cost evaluation value updating portions 28.

Specifically, the root value updating portion 27 acquires the node ID of a given root ID associated with the node identified by that root ID, and stores temporarily the acquired node ID into the root ID work memory. The cost evaluation value updating portion 28 calculates the updated cost evaluation value of each node by use of the following calculation formula: evaluation value X (cost evaluation value associated with the node identified by the root ID)+ evaluation value Y (cost evaluation value associated with the own node)=updated cost evaluation value Z (updated cost evaluation value of the own node). FIG. 13 shows pointer information in effect following the update value calculating process. If the node B in FIG. 13 is taken as an example for explanation, the root ID associated with the node B is the node D, and the root ID associated with the node D is the node D. In this case, the new root ID associated with the node B becomes the node D that is the root ID of the node D, and the root value updating portion 27 stores the node D temporarily into the root ID work memory. For the node A shown in FIG. 13, the evaluation value X and the evaluation value Y are both N, so that the updated cost evaluation value Z is calculated to be N. For the node B, the evaluation value X is 0 and the evaluation value Y is 1.0, so that the updated cost evaluation value Z is calculated to be 1.0. With regard to each of the other nodes, the updated cost evaluation value Z is calculated on the basis of the calculation formula above. The updated cost evaluation values Z calculated by the cost evaluation value updating portions 28 are stored temporarily into the cost evaluation value work memory.

The thread managing part 23 then performs the process of synchronizing the threads being subjected to parallel processing (step S204). The thread managing part 23 waits for the update value calculating processes to terminate on all threads (threads T1 through T6 in this case). After the update value calculating processes have ended on all threads, the thread managing part 23 causes the update processing part 26 to perform step S205.

The update processing parts 26 update (step S205) the root IDs and the cost evaluation values using the root values stored in the root ID work memory and the cost evaluation values placed in the cost evaluation value work memory in step S203. Specifically, each root value updating portion 27 updates the root ID associated with each node using the corresponding root ID in the root ID work memory. Each cost evaluation value updating portion 28 updates the cost evaluation value of each node using the corresponding cost evaluation value in the cost evaluation value work memory. Here, the update processing parts 26 perform their updating processes in parallel on all threads.

The thread managing part 23 carries out the process of synchronizing the threads being subjected to parallel processing (step S206). The thread managing part 23 waits for the updating processes to end on all threads. Upon completion of the updating processes on all threads, the thread managing part 23 performs step S207.

FIG. 14 shows pointer information in effect after updating processes have been performed. As shown in FIG. 14, the root IDs of all nodes are updated to those in the root ID work memory, and the cost evaluation values of all nodes are updated to those in the cost evaluation value work memory.

Upon completion of the thread synchronizing process in step S206 performed by the cost evaluation value updating portion 28, the thread managing part 23 determines whether or not $j \geq \log_2(R)$ holds (step S207). Here, R stands for the number of the nodes included in the path information acquired by the path information acquiring part 20. In the path information shown in FIG. 2, the number R is 6.

If it is determined that $j \geq \log_2(R)$ does not hold as a result of determining of process in step S207 ("No" in step S207), the variable j is incremented by 1 (step S208), and the steps subsequent to step S203 are repeated. If it is determined in step S207 that $j \geq \log_2(R)$ holds, then a return is made.

Upon completion of the updating process in step S7, it is determined whether path finding has ended (step S8). Whether path finding has terminated is determined by verifying whether or not the root ID of each node updated in step S7 points to the reference node or the root node. Since the ongoing path finding here has the reference node set as the terminating point, the path establishing process, preprocessing, and updating process are performed repeatedly until the root ID of each node points to the reference node. Of the nodes included in the path information, the root node is the terminating node. This is a node devoid of the edge information having this node set as the source node. Because the root node is not to be a source node, there is no path between the root node and the reference node. Even after the root ID of each node has pointed to the reference node or the root node, the path establishing process and the cost evaluation value updating process may be carried out repeatedly. Repeating the path establishing process and the cost evaluation value updating process permits more optimum path selection.

If it is determined in step S8 that path finding has not ended ("No" in step S8), the variable f is incremented by 1 (step S9). The path established in step S5 is reset (step S10). That is, all pointer values set in the pointer information are deleted.

In the pointer information in FIG. 14 in effect following the updating process, the updated root IDs of the node C, node D and node E do not point to the reference node or the root node. This leads the determination that path finding has not ended in step S8, so that the steps subsequent to step S5 are carried out with regard to frame 2.

FIG. 15 shows pointer information in effect before the established path determining process is started in frame 2. In frame 2, as shown in FIG. 15, the path established in frame 1 is reset, so that the pointer values of the nodes involved are deleted. And the cost evaluation value set to each node is one which was updated in the preceding frame (frame 1). That is, in frame 2, the established path determining process is performed on the basis of the cost evaluation values updated in the preceding frame.

Explained below are the steps subsequent to step S5 with regard to frame 2. First, the established path determining process is carried out on the basis of the cost evaluation values updated in the preceding frame in step S5 with regard to frame 2 (step S5). The established path determining process is explained here with reference to the flowchart of FIG. 9. As shown in FIG. 9, the thread managing part 23 first assigns to each thread each of multiple items of edge information stored in the edge information storing part, each item of the edge information being the processing object of the established path determining process (step S101). The thread managing part 23 assigns the edge information of the processing object to n threads Tt (t is one of the integers ranging from 1 to n). The thread managing part 23 performs the established path determining processes in parallel on the threads involved by the established part determining part 24.

With regard to each thread, the established path determining part 24 determines whether the path is established on the basis of the cost evaluation values and edge information updated in the preceding frame (step S102). As in frame 1, the established path determining part 24 determines whether or not the relation of (cost evaluation value set to the destination node)<(cost evaluation value set to the source node) holds. In this case, the edge ID of 1, the edge ID of 2, the edge ID of 5, and the edge ID of 6 are established to form a path. The established path determining part 24 proceeds to associate pointer values with the source nodes of the established path. FIG. 16 shows the pointer information in effect after the path has been established in frame 2. As shown in FIG. 16, the pointer information in effect following the establishment of the path in frame 2 has pointer values associated with the node B as the source node having the edge ID of 1, the node C as the source node having the edge ID of 2, the node E as the source node having the edge ID of 5, and the node F as the source node having the edge ID of 6.

The thread managing part 23 then performs the process of synchronizing the threads being subjected to parallel processing (step S103), before making a return. That is, a return is made after the established path determining part 24 has terminated the process of established path determination on all threads (T1 through Tn) that were given the assignments by the thread managing part 23.

Once the path is established by the established path determining process, the preprocessing part 25 performs preprocessing for updating the node ID and cost evaluation value to be given to each node in frame 2 (step S6). The preprocessing part 25 sets the initial update values of the root ID and cost evaluation value to each of the nodes included in the pointer information. FIG. 17 shows pointer information in effect after the preprocessing has been performed in frame 2. As shown in FIG. 17, the reference node (node D) is set with 0 as the initial update value of the cost evaluation value and with the own node (node D) as the initial update value of the root ID. The node having no value set to its pointer value (node A) is set with N as the initial update value of the cost evaluation value and with the own node (node A) as the initial update value of the root ID. The nodes having values set to their point values (node B, node C, node E, and node F) are each set with the cost of the edge identified by the edge ID as the initial update value of the cost evaluation value, and with the source node of the edge identified by the edge ID as the initial update value of the root ID.

Then follows the updating process (step S7) in which the root ID of each node and its cost evaluation value are updated on the basis of the initial update values of the root IDs and of the cost evaluation values set by the preprocessing part 25.

The updating process is explained below with reference to the flowchart of FIG. 12. As shown in FIG. 12, the thread managing part 23 first assigns to each thread each of the multiple nodes included in the pointer information as the processing object of the cost evaluation value updating process and of the root value updating process (step S201).

The thread managing part 23 assigns the processing object nodes to m threads Tt (t is one of the integers ranging from 1 to m). The pointer information in this case includes six nodes A through F, which are assigned to threads T1 through T6, respectively.

The initial value of 1 is then set to the variable i (i=1; step S202). The update processing parts 26 perform the processes of calculating update values in parallel on the threads involved (step S203).

The updating processes performed by the update processing parts 26 in step S203 acquire the root values to be updated by the root value updating portions 27, and calculate the cost evaluation values to be updated by the cost evaluation value updating portions 28. Specifically, each root value updating portion 27 acquires the node ID of a given root ID associated with the node identified by that root ID, and stores the acquired node ID temporarily into the root ID work memory. Each cost evaluation value updating portion 28 calculates the cost evaluation value of each node by use of the following calculation formula: evaluation value X (cost evaluation value associated with the node identified by the root ID)+evaluation value Y (cost evaluation value associated with the own node)=updated cost evaluation value Z (of the own node).

FIG. 18 shows pointer information in effect after the cost evaluation value calculating process has been performed in frame 2. If the node C in FIG. 18 is taken as an example for explanation, the root ID associated with the node C is the node B, and the root ID associated with the node B is the node D. In this case, the new root ID associated with the node C becomes the node D that is the root ID associated with the node B. The root value updating portion 27 stores the node D temporarily into the root ID work memory. For the node A shown in FIG. 18, the evaluation value X and the evaluation value Y are both N, so that the updated cost evaluation value Z is calculated to be N by the cost evaluation value updating portion 28. For the node B, the evaluation value X is 0 and the evaluation value Y is 1.0, so that the updated cost evaluation value Z is calculated to be 1.0 by the cost evaluation value updating portion 28. For the node C, the evaluation value X is 1.0 and the evaluation value Y is 2.0, so that the updated cost evaluation value Z is calculated to be 3.0 by the cost evaluation value updating portion 28. With regard to each of the other nodes, the updated cost evaluation value Z is calculated on the basis of the calculation formula above. The updated cost evaluation values Z thus calculated by the cost evaluation value updating portions 28 are stored temporarily into the cost evaluation value work memory.

The thread managing part 23 then performs the process of synchronizing the threads being subjected to parallel processing (step S204). The thread managing part 23 waits for the update value calculating processes to terminate on all threads (threads T1 through T6 in this case). Upon completion of the update value calculating processes on all threads, the thread managing part 23 causes the update processing parts 26 to carry out step S205.

The update processing parts 26 update the root IDs and cost evaluation values (step S205) by use of the root values stored into the root ID work memory and the cost evaluation values placed into the cost evaluation value work memory in step S203. Specifically, each root value updating portion 27 updates the root ID associated with each node using the corresponding root ID in the root ID work memory. Each cost evaluation value updating portion 28 updates the cost evaluation value associated with each node using the corresponding cost evaluation value in the cost evaluation value work memory. Here, the update processing parts 26 perform their updating processes in parallel on all threads.

Figures 19, 20:
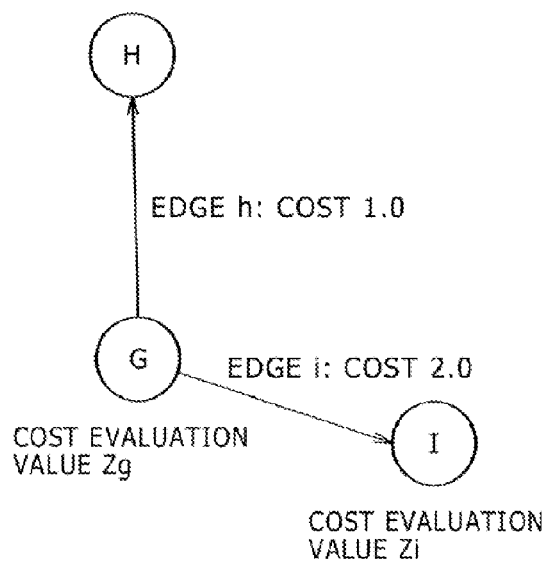
FIG. 19 is a tabular view showing pointer information in effect after the cost evaluation value updating process has been performed in frame.
FIG. 20 is a diagram showing a typical node having multiple destination nodes.

FIG. 19 shows pointer information in effect after the updating process has been performed in frame 2. As shown in FIG. 19, on all nodes, the root IDs are updated using the corresponding root IDs in the root ID work memory and the cost evaluation values are updated using the corresponding cost evaluation values in the cost evaluation value work memory.

Upon completion of the process of synchronizing the threads in step S206, it is determined whether or not $j \geq \log_2(R)$ holds (step S207). Here, R stands for the number of the nodes included in the path information acquired by the path information acquiring part 20. In the path information shown in FIG. 2, the number R is 6.

If it is determined in step S207 that $j \geq \log_2(R)$ does not hold ("No" in step S207), the variable j is incremented by 1 (step S208), and the steps subsequent to step S203 are repeated. If it is determined in step S207 that $j \geq \log_2(R)$ holds, then a return is made.

Upon completion of the updating process in step S7, it is determined whether path finding has ended (step S8).

In the pointer information shown in FIG. 19 in effect following the updating process in frame 2, the root ID of the node A points to the node A, and the root IDs of the nodes other than the node A point to the node D that is the reference node. Since the node A is the root node, the root ID always points to the own node. That means the root ID of each node included in the path information points to the reference node or the root node. It is thus determined that path finding has ended ("Yes" in step 8). This means that an optimum path from each node to the reference node has been found, so that the path finding process is brought to an end.

The ultimately determined path has the edge IDs set to 1, 2, 5, and 6 as the pointer values in the pointer information shown in FIG. 19. The cost of the path from each node to the reference node is indicated by the cost evaluation value associated with each node. The reference node is selected in this manner so that the optimum path from each node to the reference node included in the path graph may be found in parallel.

In the path graph shown in FIG. 2, the source nodes and the destination nodes are connected on a one-to-one basis. An alternative case in which one node has multiple destination nodes is explained below. FIG. 20 shows a typical node having multiple destination nodes. As shown in FIG. 20, a node G is the source node and a node H and a node I are the destination nodes. It is assumed here that Zg, Zh, and Zi represent the cost evaluation values of the node G, node H, and node I, respectively, and that the connection relationship from G to H forms an edge h (cost 1.0) and the connection relationship from G to I constitutes an edge i (cost 2.0). With such connection relationships included in the graph path, the established path determining part 24 may attempt to establish both the edge h and the edge i as the path. In this case, the established path determining part 24 is to select one of the connection relationships as the path. That is, if there exist multiple paths originating from a given node, the established path determining part 24 selects a single optimum path. Only one value is allowed to be set as the pointer value corresponding to each node included in the pointer information. Specifically, the established path determining part 24 compares the established path cost of the node G in effect if the edge h is established as a path, with the established path cost of the node G in effect if the edge i is established as a path, and selects the path of which the established path cost is the smaller of the two. The established path cost Wg(h) of the node G in effect if the edge h is established as the path is Zh+1.0, while the established path cost Wg(i) of the node G in effect if the edge i is established as the path is Zi+2.0. The established path determining part 24 selects the smaller of the established path costs Zg(h) and Zg(i) as the path. In this manner, the established path determining part 24 may select an optimum path from among multiple paths originating from the same node.

It should be noted that the above-described embodiment is not limitative of the present disclosure.

For example, the weight of at least one directed relationship between nodes may be changed while the path establishing process, preprocessing, and updating process are being repeated for each frame. In this case, the edge information stored in the edge information storing part is updated periodically. Where the time change in the weight of the directed relationships between nodes is gradual, not much change occurs in the cost evaluation value of each node. It follows that even if the costs in the edge information are updated whenever one frame is switched to another frame, the results of the path finding process that has used the evaluation values updated in the preceding frame may be used to perform the cost evaluation value updating process on the basis of the edge information in which the costs have been updated.

Also, the reference node may be changed while the path establishing process, preprocessing, and updating process are being repeated for each frame. In this case, the information about the changed reference node is applied before the established path determining process is carried out by the established path determining part 24. That is, what is done here is to change the evaluation values given to the nodes before execution of the established path determining process by the established path determining part 24. Since the reference node yet to be changed ought to have been given 0 as the evaluation value, that node is given N when changed to be no longer the reference node. The node changed to become the new reference node is given 0 as the evaluation value. The reference values given to all other nodes may be those updated in the preceding frame. The established path determining part 24 establishes the path when the relation of (cost evaluation value set to the destination node)<(cost evaluation value set to the source node) holds. It follows that the terminating point of the path is always the node of which the evaluation value is ultimately the smallest following repeated execution of the path establishing process, preprocessing, and updating process frame by frame. In this manner, even if the reference node is changed, the node of which the evaluation value is ultimately the smallest becomes the root. It is thus possible to find an optimum path despite halfway change of the reference node.

The embodiment above was explained with examples in which the reference node is the terminating point of the path. Alternatively, an optimum path having the reference node as its starting point may be found. Suppose now that the initial value setting part sets 0 to the reference node and N to the other nodes. In this case, the established path determining part 24 determines whether the relation of (cost evaluation value set to the destination node)>(cost evaluation value set to the source node) holds. If the relation above is determined to hold, the established path determining part 24 may establish the edge including the destination node and the source node as the path. The pointer values included in the pointer information indicate whether or not the path having each node as the destination node is established. The established path cost of the destination node having the connection relationship established as the path by the established path determining part 24 is associated with the sum of the connection relationship in question and of the evaluation value set to the source node. The edge ID is set to be that of the connection relationship. The root ID included in the pointer information is associated with the source node of the established path having each node as the destination node. Processes other than those above may be performed in the same manner as when the reference node is taken as the starting point of the path as described above.

The present disclosure contains subject matter related to that disclosed in Japanese Priority Patent Application JP 2014-253141 filed in the Japan Patent Office on Dec. 15, 2014, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    a graphics processing unit (GPU);
    a path information acquiring part acquiring path information formed by information indicating a connection relationship set between a plurality of nodes and by information indicating a cost of the connection relationship;
    an evaluation value giving part giving to each of the nodes included in the path information an evaluation value indicating a cost between the node in question on the one hand and a reference node serving as a reference among the nodes by a value constituting an initial value on the other hand;
    a determining part determining, in parallel for each of the plurality of nodes using the GPU, whether or not to establish as a path an interval between any two of the nodes having the connection relationship therebetween, on a basis of the connection relationship in question and on a magnitude relation between the evaluation values given to the two nodes; and
    an evaluation value updating part updating the evaluation value of each of the nodes in parallel using the GPU, on a basis of a value indicating a cost between the node in question on the one hand and a node connected therewith by the established path on the other hand;
    wherein, following the determination made by the determining part on a basis of the updated evaluation value, the evaluation value updating part executes an evaluation value updating process in parallel repeatedly using the GPU.

2. The information processing apparatus according to claim 1,
    wherein each of the nodes is given a root value indicating the node connected with the node in question via the established path; and
    the evaluation value updating part updates the evaluation value in parallel for each of the nodes to a value obtained by adding to the value indicating the cost the value indicating the cost given to the node in question.

3. The information processing apparatus according to claim 2, further comprising
    a root value updating portion updating the root value given to each of the nodes to the root value given to the node indicated by the root value.

4. The information processing apparatus according to claim 3, wherein the evaluation value updating part performs the evaluation value updating process repeatedly and in parallel until the root value given to each of the nodes points to the reference node.

5. The information processing apparatus according to claim 1,
wherein, if conditions are met for a plurality of intervals each between nodes having same source node or same destination node to be established as a path each, the determining part establishes as the path the interval between the nodes of which the values updated by the evaluation value updating part are the smallest.

6. The information processing apparatus according to claim 1,
wherein the initial value of the evaluation value given to the reference node is smaller than an initial value of the evaluation value given to any other node.

7. The information processing apparatus according to claim 6,
wherein, if the evaluation value given to the source node for the interval between any two nodes is larger than the evaluation value given to the destination node, the determining part establishes the interval between the two nodes as a path.

8. The information processing apparatus according to claim 6,
wherein, if the evaluation value given to the destination node for the interval between any two nodes is larger than the evaluation value given to the source node, the determining part establishes the interval between the two nodes as a path.

9. The information processing apparatus according to claim 1,
wherein, during repeated execution of the process, the information indicating the cost of the connection relationship is varied.

10. The information processing apparatus according to claim 1,
wherein, during repeated execution of the process, the reference node is varied.

11. The information processing apparatus according to claim 1,
wherein the path information is formed by information indicating a directed connection relationship set between a plurality of nodes and by information indicating a cost of the directed connection relationship.

12. The information processing apparatus according to claim 1,
wherein the path information is formed by information indicating an undirected connection relationship set between a plurality of nodes and by information indicating a cost of the undirected connection relationship.

13. A control method comprising:
acquiring path information formed by information indicating a connection relationship set between a plurality of nodes and by information indicating a cost of the connection relationship;
giving to each of the nodes included in the path information an evaluation value indicating a cost between the node in question on the one hand and a reference node serving as a reference among the nodes by a value constituting an initial value on the other hand;
determining, for each of the nodes, in parallel, using a graphics processing unit (GPU), whether or not to establish as a path an interval between any two of the nodes having the connection relationship therebetween, on a basis of the connection relationship in question and on a magnitude relation between the evaluation values given to the two nodes; and
updating the evaluation value of each of the nodes in parallel using the GPU, on a basis of a value indicating a cost between the node in question on the one hand and a node connected therewith by the established path on the other hand;
wherein, following the determination made in the determining on the basis of the updated evaluation value, the evaluation value updating executes an evaluation value updating process in parallel repeatedly using the GPU.

14. A non-transitory computer readable medium having stored thereon a program for a computer, the program causing the computer to:
by a path information acquiring part, acquiring path information formed by information indicating a connection relationship set between a plurality of nodes and by information indicating a cost of the connection relationship;
by an evaluation value giving part, giving to each of the nodes included in the path information an evaluation value indicating a cost between the node in question on the one hand and a reference node serving as a reference among the nodes by a value constituting an initial value on the other hand;
by a determining part, determining, for each of the nodes, in parallel, using a graphics processing unit (GPU), whether or not to establish as a path an interval between any two of the nodes having the connection relationship therebetween, on a basis of the connection relationship in question and on a magnitude relation between the evaluation values given to the two nodes; and
by an evaluation value updating part, updating the evaluation value of each of the nodes in parallel using the GPU, on a basis of a value indicating a cost between the node in question on the one hand and a node connected therewith by the established path on the other hand;
wherein, following the determination made by the determining part on the basis of the updated evaluation value, the evaluation value updating part executes an evaluation value updating process in parallel repeatedly using the GPU.

* * * * *